United States Patent [19]

Pound

[11] Patent Number: 4,566,236
[45] Date of Patent: Jan. 28, 1986

[54] GREENHOUSE STRUCTURE ELEMENT

[76] Inventor: John A. Pound, 2131 Piedmont Way, Pittsburg, Calif. 94565

[21] Appl. No.: 578,750

[22] Filed: Feb. 9, 1984

[51] Int. Cl.$^4$ .................................................. E04B 1/00
[52] U.S. Cl. .......................................... 52/222; 52/2; 52/202; 47/17; 160/354; 160/380; 24/460
[58] Field of Search .......................... 52/222, 202, 2; 160/354, 368, 380, 392; 47/17, 28, 54; 24/460, 454

[56] References Cited

U.S. PATENT DOCUMENTS

| | | |
|---|---|---|
| 3,803,671 | 4/1974 | Stuppy et al. |
| 4,189,880 | 2/1980 | Ballin .................................. 52/222 X |
| 4,231,141 | 11/1980 | Derrick et al. |
| 4,453,585 | 6/1984 | Ruggeberg et al. .................. 52/222 |

FOREIGN PATENT DOCUMENTS 2228923 12/1974 France .................................. 52/222

OTHER PUBLICATIONS

Brochure entitled: Growers Have It Made in the Shade with T-LOK.

*Primary Examiner*—J. Karl Bell
*Attorney, Agent, or Firm*—Manfred M. Warren; Robert B. Chickering; Glen R. Grunewald

[57] ABSTRACT

A device for holding flexible sheet material to a structure including a fixed element that is attachable to the structure and has at one end an elongated cavity and at the other end an intrinsic lock mechanism and a locking device having at one end an arm for holding sheet material against the interior portion of the cavity and for bearing against the open edge of the cavity, the locking element also having the second half of an intrinsic lock device that is adapted to snap into the intrinsic lock device half on the fixed element.

2 Claims, 2 Drawing Figures

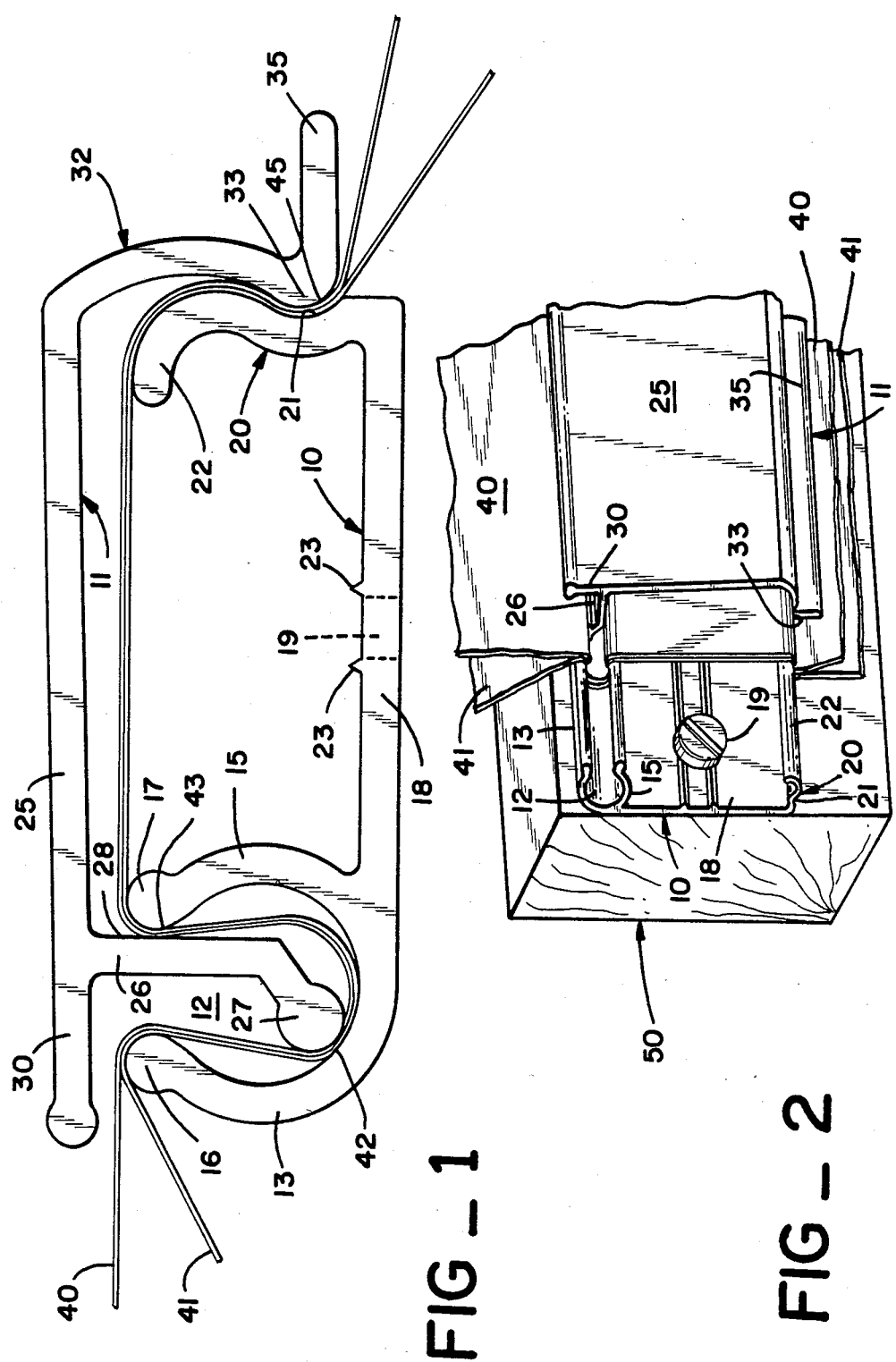
FIG_1
FIG_2

GREENHOUSE STRUCTURE ELEMENT

FIELD OF THE INVENTION

This invention is in the field of greenhouses made of flexible sheet material.

BACKGROUND OF THE INVENTION

Greenhouses made of flexible sheet material, such as transparent polyethylene sheet, have come into widespread use. The greenhouses are made by constructing structural elements such as spaced columns connected with metal arches and then stretching transparent or translucent flexible sheet material over the structure. In a preferred structure two sheets of flexible sheet material are provided and air under pressure is injected between them whereby the two sheets are held apart by the inflating air. Such structure requires that the two sheets be held together at their edges in a sealing relationship so that the inflating air cannot escape too rapidly.

To provide a sealing relationship at the edges of double-sheet structures, elongated clamps have been developed. These clamps generally have means that lock the edges of the flexible sheets together with adequate force to seal the air between them but with not enough force to tear or destroy the sheets. Preferably the locks are releasable so that the sheets can be removed or replaced. The devices for locking the sheets together and holding them in place are usually connected to the greenhouse structure, for example, adjacent to the roof portion or if several structures are employed side by side in the gutter areas between them.

Several locking devices are commercially available. The better of these include an elongated cavity into which the edge portions of the polyethylene sheets are placed after which a locking element is inserted into the cavity thereby pressing the double sheets against the interior wall of the cavity and holding them in place. The other end of the locking element is then restrained with a separate clip. Problems with the prior products of this type are that separate clips are needed which require tools to install, the clips are frequently sharp or in any event interfere with those portions of the flexible sheet material that extend beyond them, and the sheet material must be cut to provide space for the clips to engage the locking devices.

SUMMARY OF THE INVENTION

This invention is an improved device for holding one or more sheets of flexible transparent sheet material in place in a greenhouse or similar structure. The device of this invention mitigates or overcomes the problems associated with prior devices used for the same purpose.

The device of this invention is in the form of two elongated elements, preferably aluminum extrusions, each of which elements includes half of an intrinsic lock. One of the elements, which is normally fixed to a greenhouse structure, includes an elongated cavity and half of the intrinsic lock while the other element, which is herein called the locking element, includes a portion that can enter and bear against the interior of the cavity of the fixed element, a portion that can bear against the opening of the cavity of the fixed element, and the second half of the intrinsic lock.

In use, the flexible sheet material and the bearing portion of the locking element are inserted into the cavity and upon bringing the two intrinsic lock elements together into locking relationship the flexible sheet material is held by the two elements bearing against each other at three separate locations. Thus, the device of this invention provides a triple seal for flexible sheet material employing only two elements with no separate clips or sharp edges. Flexible sheet material may be installed, employing the device of this invention, either with no tools or with simple hand tools, and in addition the device of this invention may be disassembled readily to remove flexible sheet material either for storage or to be replaced.

BRIEF DESCRIPTION OF THE DRAWINGS

FIG. 1 is an end view of a device embodying this invention.

FIG. 2 is a partial perspective view of the device illustrated in FIG. 1.

DETAILED DESCRIPTION OF THE INVENTION

The device of this invention illustrated in the embodiment of the drawings includes a fixed element generally designated 10 and a locking element generally designated 11. The fixed element 10 includes a cavity 12 that is formed by an outer circumferential part 13 and an inner circumferential part 15. Outer part 13 terminates in a rounded edge 16 while part 15 terminates in a rounded bearing edge 17. These edges are rounded to avoid sharp edges that would tear or weaken flexible sheet material stretched around the various parts. The fixed element includes a spacing element 18, which may include a punched hole 19 for attaching the fixed element 10 to a structure with a screw or bolt. Spacing element 18 is also provided with parallel ridges 23 for centering and guiding a screw or other fastener to hold the fixed element to a structure.

At the other end of spacing element 18 is a half intrinsic lock 20 which is a snap lock or spring lock that includes a detent 21 and an upper extension 22.

Locking element 11 also includes a spacing element 25 which generally coincides with spacing element 18. The length of spacing element 25 is related to the length of spacing element 18 so that the locking elements will coincide when other elements of the device are in their proper position. Spacing element 25 has a sheet engaging element or lateral extension 26 extending down from it and lateral extension 26 terminates in a cavity bearing part 27 which has a rounded end to avoid damaging flexible sheet material. The lateral extension 26 also includes an edge bearing part 28 that bears against the interior surface of enlarged edge 17 when the two elements of the device are in the position shown. A forward extension 30 also extends from spacing element 25. The forward extension 30 is useful to prevent the flexible sheet from direct exposure to the sun in those places where it is mechanically stressed.

At the other end of spacing element 25, there is the second half of the intrinsic lock generally designated 32. The half intrinsic lock 32 includes a nose 33 that is positioned to nest within detent 21. A rear extension 35 is also provided primarily as a stiffening element to prevent distortion of half lock 32 to insure a good fit with half lock 20.

In use, two flexible transparent or translucent sheets 40 and 41 are laid over the upper portion of fixed piece 10 with the loose ends of the sheets draping beyond half lock 20. The double sheets forming a roof or wall extend over rounded part 16. With the sheets thus in place, lateral extension 26 is forced into cavity 12 and thereby forces sheets 40 and 41 into cavity 12. When sheets 40 and 41 are forced into contact with the interior wall of cavity 12, rear extension 35 is lowered until nose 33 snaps into detent 21. The spacers 18 and 25 as well as the half lock portions 22 and 32 are springy enough so that nose 33 can be urged over the rearwardly extending part of upper extension 22 and can snap into detent 21 in a locking relationship. In the position shown, sheets 40 and 41 are firmly held together at bearing point 42 within cavity 12, at bearing point 43 at the upper opening of cavity 12, and at bearing point 45 between detent 21 and nose 33. Although illustrated as bearing points in FIG. 1 these elements really bear against each other as lines, which is evident from FIG. 2. The device of the drawings grips the flexible sheets more firmly as the flexible sheet material is stretched, either by inflation or by wind. As sheets 40 and 41 are pulled tighter bearing point 42 moves upwardly in cavity 12 and the bearing force at points 43 and 21 increases.

The fixed element and locking element are normally aluminum extrusions that are made in incremental lengths. Preferably the fixed elements 10 are about twelve feet long and are mounted on beam 50 end to end, either abutting or closely spaced to one another. Locking elements 11 preferably are in two-foot lengths. Thus, a sixty foot length of greenhouse roof may have five such twelve-foot increments of fixed element 10 and thirty, two-foot increments of locking element 11 along one edge, and holding sheets 40 and 41 between bearing points 42, 43 and 45 will adequately seal the sheets together so that air may be introduced between them along the entire sixty-foot length of the elements. The sharp bends of sheets 40 and 41 will cause the sheets to be held firmly together even in the gaps between increments so that leakage of air will be minimum and not sufficient to create any problems with keeping the space between sheets 40 and 41 inflated. Two-foot lengths of locking elements are much easier to install than longer elements and are readily used during fitting up where they can be installed and removed frequently to adjust the position of the flexible sheet.

The device of this invention can be assembled without the use of tools by simply forcing the elements together with sheets 40 and 41 between them. In addition to stiffening the locking element, rear extension 35 is useful in separating the elements from one another when it is desired to remove sheets 40 and 41. Although size is not an essential feature of the device of this invention, the device illustrated in FIG. 1 will normally have an overall length from the end of forward extension 30 to the end of rear extension 35 of from one-half to two inches. The wall thicknesses of the various elements should be related to the length of the spacing elements to provide sufficient flexibility for the operation of the lock between nose 33 and detent 21 to be readily assembled and disassembled and yet to be strong enough to avoid breaking. For ordinary aluminum extrusions, a wall thickness of about 0.06 inches is satisfactory.

What is claimed is:

1. An assembly to hold the edge of a flexible sheet to a structure comprising:

a fixed piece including means to be fixed to said structure, said fixed piece having a cavity opening between an edge and a bearing edge, a first intrinsic lock element spaced from said cavity opening, a locking piece including a sheet engaging element extending from one end thereof, said sheet engaging element including a cavity bearing portion and a cavity edge bearing portion, and a second intrinsic lock element spaced from said sheet engaging element to engage said first lock element in locking relationship when said sheet engaging element is engaged with the interior of said cavity, one of said first intrinsic lock element and second intrinsic lock element having a detent and the other of said lock elements having a nose spaced and dimensioned to snap into said detent.

2. The device of claim 1 wherein one of said lock elements includes a stiffening rear extension.

* * * * *